Nov. 3, 1936.    D. L. SMITH    2,059,755
TRACING DEVICE, MORE ESPECIALLY FOR CUTTING MACHINES
Filed Feb. 1, 1934    2 Sheets-Sheet 1
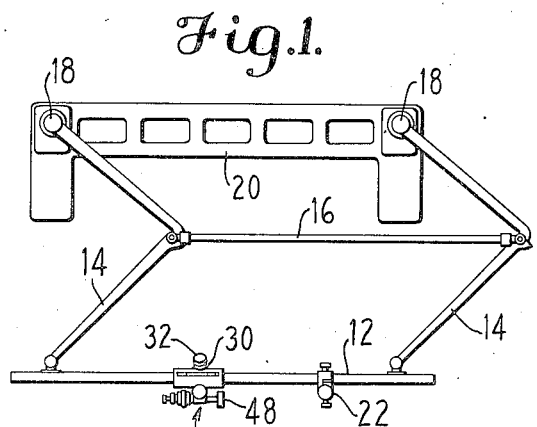
Fig.1.
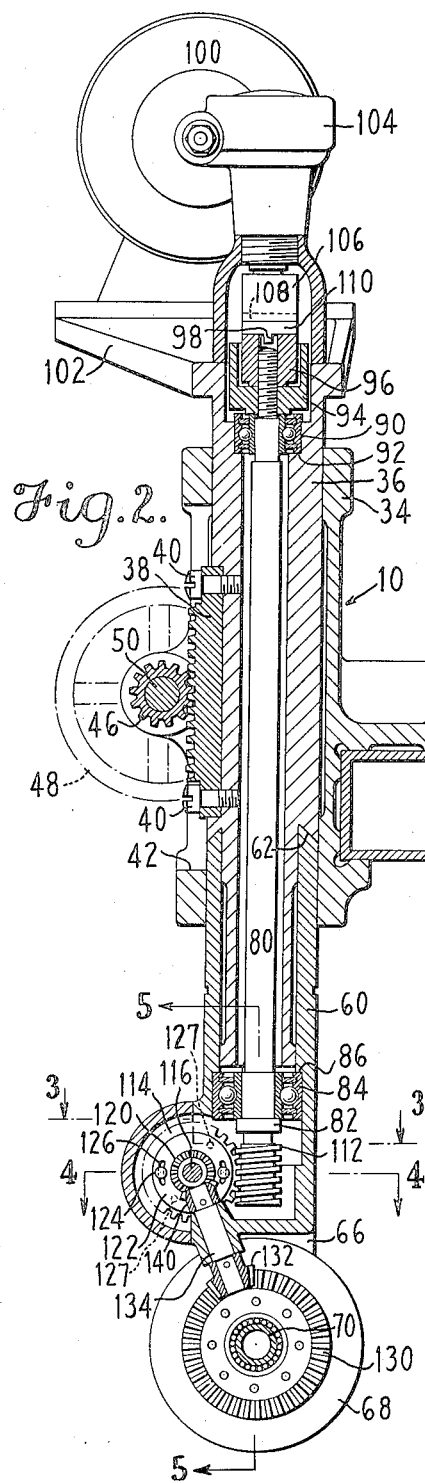
Fig.2.
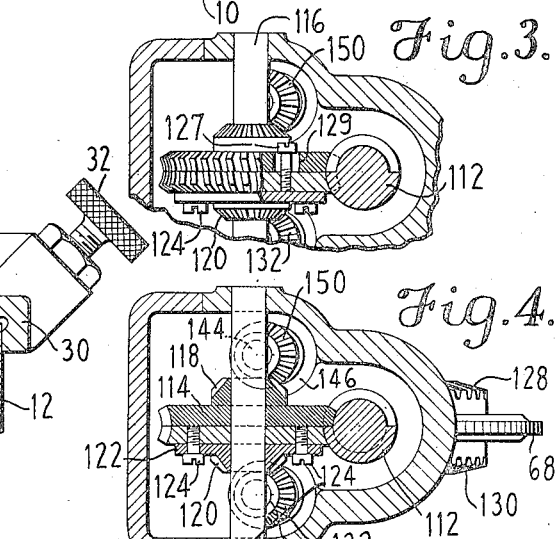
Fig.3.
Fig.4.
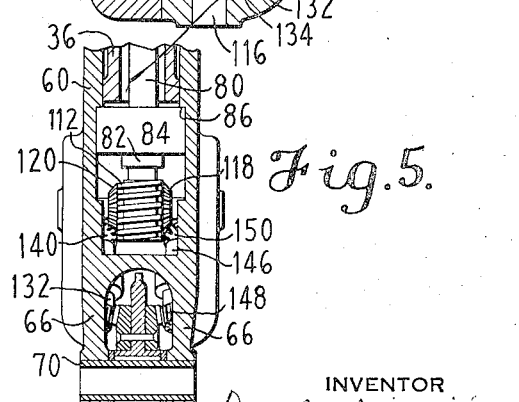
Fig.5.
INVENTOR
Donald L. Smith
BY
ATTORNEY Nov. 3, 1936.     D. L. SMITH     2,059,755
TRACING DEVICE, MORE ESPECIALLY FOR CUTTING MACHINES
Filed Feb. 1, 1934     2 Sheets-Sheet 2
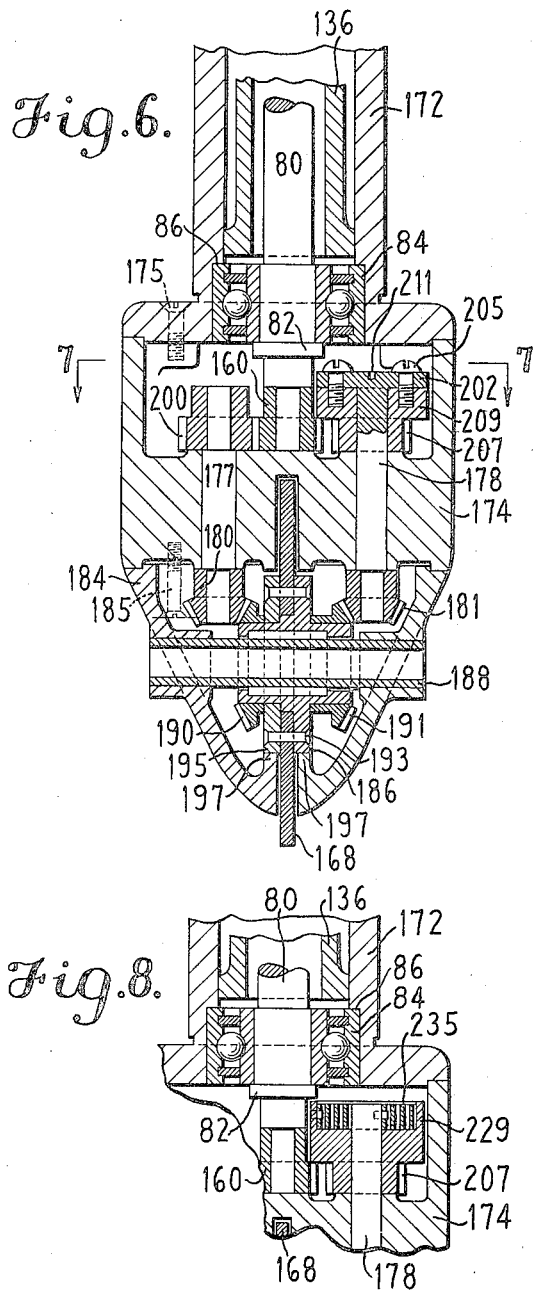
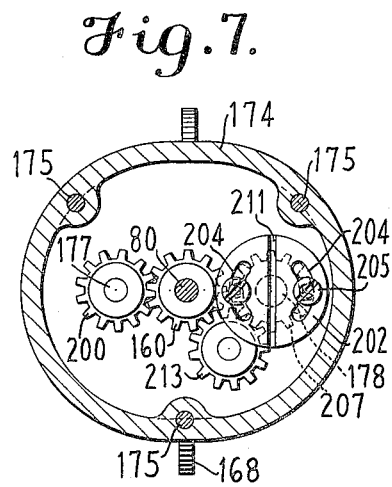
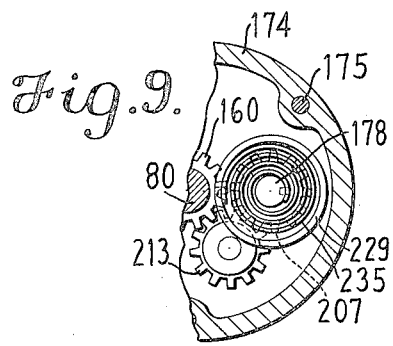
INVENTOR
Donald L. Smith
BY J. F. Brandenburg
ATTORNEY Patented Nov. 3, 1936

2,059,755

UNITED STATES PATENT OFFICE 2,059,755

TRACING DEVICE, MORE ESPECIALLY FOR CUTTING MACHINES

Donald L. Smith, Dunellen, N. J., assignor to Air Reduction Company, Incorporated, New York, N. Y., a corporation of New York Application February 1, 1934, Serial No. 709,393

12 Claims. (Cl. 33—23)

The invention relates principally to motor-driven apparatus and machines for cutting and welding metals by means of heat, as with oxy-acetylene and other oxy-fuel-gas torches, atomic hydrogen torches or electrodes. For precision and production operations of this character, it was early recognized that uniformity of movement of the torch or thermal instrumentality at the proper speed was the great desideratum. In order to perform clean and accurate cutting with the oxygen torch, the steadiness with which the torch is caused to pursue its intended course is of the greatest moment.

Constant effort has been made toward providing more reliable motors suitable for the purpose, more effective control and adjustment of motor speed, and firmer movable supports, carriages or linkages for carrying the torches in their movements over the work and for transmitting to the torches movement obtained by the travel of motor-driven traction wheels or rolling tracers on drawings, templates, tracks or other surfaces.

I have found that a source of serious unevenness of torch movement exists in the drive between the motor and the traction wheel or wheels, or the driven wheel or roller of the tracer, which drive must necessarily comprise gearing capable of effecting large speed reduction, plus such other gearing as it may be necessary to arrange at the low-speed end of the train to make connection with the traction wheel. The effect of lost motion due to backlash or wear toward the high-speed end of the torch drive may be insignificant, but lost motion toward the low-speed end, whether it be in amount that is practically unavoidable in the design of the gearing or of larger amount due to wear, will actually cause the torch to slow up, or even stop momentarily, at times, or to accelerate at others. The periods in which these changes occur are very brief and the irregularity of motion may be easily overlooked, but nevertheless it is actively detrimental.

It is an object of this invention to make possible more perfect cutting or welding by removing this rather obscure cause of uneven torch movement. The invention is applicable to various motor-driven torch machines and devices, though it is especially advantageous in apparatus in which the traction or tracer wheel is directed in a course in which there are changes of direction, reproduced more or less in the path traversed by the torch.

A more specific object of the invention, therefore, is to improve the motor-driven tracers of universal cutting or welding machines. Naturally the improvement in tracers may be applied to motion reproduction machines wherever extreme steadiness of movement of an instrument is desirable.

The type of tracer commonly used to move and guide the torch of a universal cutting machine has a wheel which contacts with a drawing or other pattern, and means for swiveling the axle of the wheel about an axis through its point of traction so that the tracer may be steered or may follow along the outline or contour of the pattern. Sometimes the outline to be cut is laid out on the work and the tracer is steered by remote control so that the torch follows this outline on the work. The term "tracer" is intended to include such driving wheel devices whether they are guided over a drawing, or in contact with a template, or not. In either case the torch and the wheel of the tracer follow similar paths. In some machines the path of the torch is similar to, but a reversal of the path traveled by the tracer wheel.

Other objects, features and advantages of the invention will appear or be pointed out as the specification proceeds.

In the accompanying drawings, forming part hereof:

Fig. 1 is a diagrammatic top plan view of a universal cutting or welding machine equipped with the tracing device of this invention;

Fig. 2 is a vertical sectional view of a tracer or traction device embodying the invention;

Fig. 3 is a fragmentary sectional view on the line 3—3 of Fig. 2;

Fig. 4 is an enlarged sectional view on the line 4—4 of Fig. 2;

Fig. 5 is a sectional view on the line 5—5 of Fig. 2;

Fig. 6 is an enlarged vertical sectional view showing a modified form of the invention;

Fig. 7 is a sectional view on the line 7—7 of Fig. 6; and

Figs. 8 and 9 are fragmentary sectional views showing a modification of the structure shown in Figs. 6 and 7, respectively.

A tracer 10 is shown in Fig. 1 connected with a front bar 12 of a universal cutting or welding machine of the folding parallelogram type. The bar 12 is supported by jointed arms 14 which are pivotally connected to the opposite ends of a link 16. The jointed arms are pivoted to columns 18 upstanding from a frame 20. This linkage causes the bar 12 to always move parallel to itself, and a torch 22 connected to the bar 12 will always move in a path similar to that followed by the tracer 10. This folding parallelogram type of universal cutting or welding machine is well known in the art and illustrates one type of machine to which the tracer of this invention is applied.

The tracer is connected with the bar 12 by a clamp fitting or bracket 30, which is slidable along the bar but can be held in any set position by a clamp screw 32. Referring to Fig. 2, the clamp fitting or bracket 30 has a vertical tubular bearing 34. A sleeve 36 extends through this tubular bearing.

A rack 38 is fastened to the sleeve 36 by screws 40. This rack extends through a slot 42 in the front side of the tubular bearing 34 and serves as a key to prevent turning of the sleeve 36 in the tubular bearing. The rack 38 is shorter than the slot 42, so that the sleeve 36 can move vertically for a limited distance.

A pinion 46 meshes with the rack 38, and this pinion is connected to a hand-wheel 48 by a shaft 50. When the hand-wheel is rotated, the rack and pinion mechanism is operated to raise and lower the sleeve 36 in the tubular bearing 34 to move the tracer out of or into contact with the drawing or table.

The lower end of the sleeve 36 is of reduced diameter and a tracer holder 60 fits over this lower end as a bearing. The upper end of the tracer holder 60 has a sloping annular face which contacts with an undercut shoulder 62 on the sleeve 36.

The lower end of the tracer holder 60 has side members 66. A traction or tracer wheel 68 runs on a horizontal axle 70 extending through these side members.

The tracer is held in assembled relation and power transmitted to the tracer wheel by a shaft 80 which extends through the sleeve 36 and has its axis in line with the point of traction of the tracer wheel.

The lower end of the vertical shaft 80 has a collar 82 supporting a ball bearing 84, in which the vertical shaft runs. The ball bearing 84 fits within the tracer holder 60 and abuts against a shoulder 86 to support the tracer holder and to keep its upper end in contact with the undercut shoulder 62 and hold the tracer assembled.

The upper end of the vertical shaft 80 turns in a ball bearing 90, which fits within the upper end of the sleeve 36 and is held against downward movement by a shoulder 92. A nut 94 is threaded on the end of the vertical shaft 80 and abuts against the ball bearing 90. End play in the vertical shaft 80 is taken up by turning the nut 94 so that it raises the vertical shaft 80 until the tracer holder 60 is in contact with the undercut shoulder 62. The nut 94 is held in any set position by a lock-nut 96, which fits within a recess in the nut 94 and has a slot 98 in its top face for receiving a tool.

The vertical shaft 80 is driven by a motor 100, which is supported on a platform 102. This platform is integral or connected with the upper end of the sleeve 36. The motor drives worm reduction gearing 104, to which is connected a coupling member 106 in alinement with the vertical shaft 80.

The lower end of the coupling member 106 is slotted to receive a tongue 108 of an intermediate coupling member 110. A tongue on the bottom side of the intermediate coupling member 110 fits into the slot 98 so that the lock-nut comprises the bottom member of the coupling.

The ball bearings 84 and 90 serve both as thrust bearings and as shaft bearings for the vertical shaft 80. The end thrust of the shaft 80 is taken by the ball bearing 84 or 90, depending on whether this thrust is up or down. These bearings are capable of withstanding long service without noticeable wear.

If any end play develops in the vertical shaft 80 it can be quickly and effectively taken up by removing as a unit the motor 100 and driving connections above the lock nut 96, backing off the lock nut, and then turning the nut 94 sufficiently to lift the tracer holder 60 into contact with the undercut shoulder 62.

A worm 112 is secured to the lower end of the vertical shaft 80, and drives a worm wheel 114 on a cross-shaft 116 carried by the tracer holder 60. The worm wheel 114 is divided into two halves, with the division at the middle of its teeth and in its plane of rotation. There are bevel gears 118 and 120 on opposite sides of the worm wheel 114. The bevel gear 118 is integral with one half of the worm wheel 114, but the bevel gear 120 has a flange 122 and is secured to the other half of the worm wheel by screws 124 which pass through slots 126 in the flange and thread into the worm wheel.

The slots 126 are curved about a center on the axis of the cross-shaft 116, so that, when the screws 124 are loosened, the bevel gear 120 can be rotated with respect to the worm wheel 114 and bevel gear 118.

The two halves of the worm wheel are clamped together by screws 127 which extend through arcuate slots 129 in one half of the worm wheel and thread into the other half of the worm wheel. The slots 129 are similar to the slots 126 and permit relative angular movement of the two halves of the worm wheel about the axis of the shaft 116 when the screws 127 are loosened. Such relative movement of the two halves of the worm wheel causes one half of each tooth to move slightly ahead of the other half of the tooth, as shown in Fig. 3. This movement of the teeth has the same effect as if their thickness were increased and takes up the play or lost motion of the teeth in the threads of the worm. When the two halves of the worm wheel have been set so that there is no lost motion between the worm and worm wheel, the screws 127 are tightened to clamp the two halves of the worm wheel together so that they turn as a unit.

The tracer wheel 68 has bevel gears 128 and 130 fastened to it on opposite sides, as shown in Fig. 5. The bevel gear 130 meshes with a gear 132, which is fastened on the lower end of a shaft 134 (Fig. 2). This shaft extends through a bearing 136 in the tracer holder, and a gear 140 fastened to the upper end of the shaft meshes with the bevel gear 120.

A shaft 144 (Fig. 4) extends through a bearing 146 in the tracer holder, and has gears 148 and 150 fastened to its lower and upper ends, respectively, and meshing with the bevel gears 128 and 118, respectively.

The worm wheel 114 and the bevel gears 118 and 120 comprise driving means, and the shafts 134 and 144 with their gears constitute two separate gearing connections of equal value between the driving means and the tracer wheel 68. Gearing connections or trains are of equal value or equivalent when they have the same ratio of the angular velocities of the first and last axes. Either of these gearing connections can be used to transmit the driving power to the tracer wheel 68, but it is preferable to drive through the shaft 144 and its cooperating gears because the bevel gear 118 is integral with the worm wheel.

When the tracer is first assembled, the bevel gear 120 is set in such angular relation with respect to the bevel gear 118 that, when the gearing connections of the gear 118 are driving the wheel, the gearing connections of the gear 120 lag behind the driving gearing connections by the amount of the backlash of the gearing. Expressed in another way, the gear faces of the gearing connections which include the shaft 144 contact to transmit force to drive the tracer wheel forward, while the gear faces of the gearing connections which include the shaft 134 contact as if they were driving the tracer wheel in a reverse direction, and thus take up all lost motion which would otherwise be present because of backlash in the gears. When the bevel gears 118 and 120 are in such angular relation that all lost motion between the driving means and tracer wheel is eliminated, the screws 124 are tightened to hold these gears in their set relation.

Figs. 6 and 7 show a modified form of the invention, in which a spur gear 160 fastened to the lower end of the shaft 80 constitutes the driving means and has two separate gearing connections to a tracer wheel 168, which corresponds to the wheel 68 in Figs. 2–5 but has bevel gears connected to it in a different way so that the gears can be enclosed in a housing. The upper part of the tracer shown in Figs. 6 and 7 is identical with that shown in Fig. 1, but the swivel portion or tracer holder is made in three parts for assembly reasons.

The tracer holder shown in Figs. 6 and 7 has an upper portion 172 which fits over the sleeve 136 just as the tracer holder 60 does in Fig. 2. An intermediate body portion 174 is fastened to the upper portion 172 by screws 175. Shafts 177 and 178 extend through bearings in the intermediate body portion and have bevel gears 180 and 181, respectively, secured to their lower ends.

The tracer holder has a bottom housing 184 connected to the body portion 174 by screws 185. The tracer wheel 168 has a hub 186 supported on roller bearings by an axle 188 carried by the bottom housing 184. Bevel gears 190 and 191 are secured to the hub 186 in positions to mesh with the bevel gears 180 and 181, respectively. The bottom housing 184 encloses the gears 180, 181, 190 and 191, so that they are protected and can be run in grease if desired.

The tracer wheel 168 is connected to its hub 186 by rivets 193 which extend through the hub and wheel, and through a hub plate 195 on the side of the wheel opposite the hub. The peripheries of the hub 186 and hub plate 195 bear against ribs 197 of the bottom housing, to prevent the entrance of dust or dirt into the housing and to keep grease from leaking out.

A gear 200 is rigidly connected to the upper end of the shaft 177 and meshes with the driving gear 160. The shaft 178 has a flange 202 at its upper end with arcuate slots 204 through which screws 205 extend. A gear 207 on the shaft 178 has a flange 209 into which the screws 205 extend to connect the gear 207 with the shaft 178. When the heads of the screws 205 are not clamped against the flange 202, the shaft 178 is free to turn with respect to the gear 207 within angular limits imposed by the length of the slots 204. There is a slot 211 in the top face of the flange 202 for receiving a screw-driver to turn the flange and its connected shaft 178.

An idler gear 213 meshes with the gear 207 and with the driving gear 160.

Lost motion resulting from backlash in the gearing in Figs. 6 and 7 is taken up by loosening the screws 205 and turning the flange 202 and gear 207 in opposite directions as far as possible. Considering the gear 160 as fixed at the time this adjustment is made, the gear 207 and idler 213 can be moved in either direction by the amount of play or backlash in their teeth and are then held from further movement by the gear 160. The movement of the gear 207 in the opposite direction turns the shaft 178. This turning movement of the shaft is transmitted through the bevel gears to the shaft 177 and gear 200. The shaft 177 and gear 200 are turned in the opposite direction to the shaft 178 until the lost motion in the gear teeth is taken up and the gear 207 prevented from turning further by the contact of the gear 200 with the driving gear 160.

With the parts in these positions, the gearing connections on one side of the tracer wheel have their faces in contact as if driving the wheel in a forward direction, while the gearing connections on the other side of the tracer wheel have their faces in contact as if driving the tracer wheel in a reverse direction. The screws 205 are clamped against the flange 202 to hold the parts in this relation, which eliminates all lost motion in the gearing connections between the driving gear 160 and the tracer wheel 168.

Figs. 8 and 9 show a modification of the form of the invention illustrated by Figs. 6 and 7. The gear 207 has a spring housing 229 in place of the flange 209 in Fig. 6. The shaft 178 has no connecting flange at its upper end, but is resiliently connected with the gear 207 by a spiral spring 235 which has its inner end anchored to the shaft 178 and its outer end fastened to the spring housing 229.

The spring 235 is under tension and tends to turn the gear 207 and shaft 178 in opposite directions to take up the lost motion in the gearing connections in the same manner as in Fig. 6. The spring 235 automatically moves the shaft 178 with respect to the gear 207 whenever such movement becomes necessary as the result of wear which increases the backlash of the gears. In Fig. 6 the mechanism must be manually adjusted to compensate for wear of the gears.

The spring 235 gives the driving mechanism a resilience not present in the clamping screws 205 which hold the parts rigidly set in the desired relation. Any force strong enough to overcome the spring 235 will cause lost motion in the modified form of the invention shown in Figs. 8 and 9, but the spring is strong enough and under sufficient tension to effectively resist the variable forces to which a tracer is subject in practice. The spring drive of Figs. 8 and 9 is a positive driving connection, however, because the drive shaft can not continue to turn indefinitely without rotating the traction, as would be the case with an impositive friction drive.

Some modifications of the invention have been described, but other changes can be made without departing from the invention defined in the claims.

I claim:

1. A tracing device having a driven member, a driving member, and gearing connecting the driving member with the driven member, characterized by the fact that the gearing connections include two equivalent trains which are movable relatively to one another to take up any lost motion resulting from backlash in the gearing.

2. In a tracing device of the type having a driven member and a drive shaft, the combination of two gearing connections of equal value between the drive shaft and the driven member, one of the gearing connections being movable relatively to the other, and means for holding said connections in such relation that one of them drives the driven member and the other lags behind the driving connection by an amount equal to the combined backlash of both gearing connections so that there is no lost motion in the gearing connections between the drive shaft and the driven member.

3. In a tracing device having a driven member and gearing operatively connecting the driven member with a drive shaft, the combination of a number of equivalent gearing elements and means for holding said elements in such relation that the driving connections of the gearing rotate the driven member in a forward direction while other elements of the gearing contact with one another in the same manner as if driving said driven member in a rearward direction and thus prevent backlash of the gearing from causing lost motion in the driving connections.

4. A tracer wherein a driven member has gear means connected with it, and said driven member is operated by driving means, characterized by two gearing connections of equal value meshing with said gear means and with teeth on the driving means, one of said gearing connections serving to transmit power to the driven member while the other of said gearing connections is rotated by the driven member and contacts with the front faces of teeth on the driving means so that there is no lost motion in the gearing between the driving means and the driven means.

5. In a tracing device having a driven member and driving means, the combination of two gearing connections of equal value between the driving means and the driven member, two gears in the driving means which turn as a unit during the operation of the tracing device but are movable with respect to one another so that they can be set in such relation to one another that the front and back faces, respectively, of their teeth contact with their gearing connections, and means for holding said gears in such relation.

6. In a tracing device of the type including a vertical drive shaft, a worm on the lower end of the shaft, a worm wheel driven by the worm, and a tracer wheel supported for swivel movement about the axis of the vertical drive shaft, the combination of gears on both sides of the tracer wheel, other gears on opposite sides of the worm wheel operatively connected with the respective gears on the tracer wheel, and releasable means fastening one of the gears to the worm wheel so that the gear can be turned to change the angular relation of its teeth with respect to the gear on the other side of the worm wheel.

7. In a tracing device of the class including a vertical drive shaft, a worm on the lower end of the shaft, a worm wheel driven by the worm, a tracer wheel and a tracer holder supporting the wheel for swivel movement about the axis of the vertical drive shaft, the combination of bevel gears on both sides of the tracer wheel, other bevel gears on opposite sides of the worm wheel, two shafts supported in bearings in the tracer holder, a bevel gear at the upper end of each shaft in mesh with one of the gears on the worm wheel, a bevel gear at the lower end of each shaft in mesh with one of the gears of the tracer wheel, the gear on one side of the worm wheel being movable angularly with respect to the other, and releasable means for holding this angularly movable gear in any set relation to the gear on the other side of the worm wheel.

8. In a tracing device having a driven member and driving means, two separate gearing connections of equal value between the driving means and the driven member, elements of one gearing connection being relatively movable in opposite directions as far as the backlash of the tracer gearing will permit, and means for holding said elements in such relation that there is no lost motion in the gearing connections between said driving means and driven member.

9. In a tracer of the class having a motor and a traction wheel, the combination of two gears connected with the traction wheel, a bevel gear meshing with each of said gears, a housing enclosing all of the gears, a shaft connected to each of said bevel gears, and other gears operatively connecting the shafts with a common driving gear which is rotated by the motor, one of said shafts being angularly movable with respect to one of its gears to take up play in the gearing connections between the motor and the traction wheel.

10. In a tracing device having a driven member, mechanism for driving the driven member including two equivalent gear trains and spring means for causing movement of the gears in one train relative to those of the other to take up all lost motion resulting from backlash in the gearing.

11. In a tracer of the class including a driven member and driving means, two separate gearing conections between the driving means and the driven member, elements of one gearing connection being relatively movable and having spring means urging them in opposite directions as far as the backlash of both gearing connections will permit so that the spring means take up lost motion in the gearing connections.

12. In a tracing device of the type having a motor and a traction wheel connected by speed-reducing gearing including a drive shaft and a worm on said drive shaft, the combination of a thrust bearing, threaded means for adjusting said thrust bearing to take up end play in the worm, and relatively movable elements in the gearing between the worm and traction wheel adjustable to take up play in said gearing, whereby lost motion between the driving motor and traction wheel is substantially eliminated.

DONALD L. SMITH.